(12) United States Patent
Kopp

(10) Patent No.: US 9,134,147 B2
(45) Date of Patent: Sep. 15, 2015

(54) MEASURING ARRANGEMENT SYSTEM FOR A UNIVERSAL PROCESS CONNECTION

(75) Inventor: Thomas Kopp, Wolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 198 days.

(21) Appl. No.: 13/549,059

(22) Filed: Jul. 13, 2012

(65) Prior Publication Data

US 2013/0074605 A1 Mar. 28, 2013

Related U.S. Application Data

(60) Provisional application No. 61/540,956, filed on Sep. 29, 2011.

(30) Foreign Application Priority Data

Sep. 28, 2011 (EP) ..................................... 11183035

(51) Int. Cl.
*F16B 31/02* (2006.01)
*G01D 11/30* (2006.01)
*G01L 19/00* (2006.01)

(52) U.S. Cl.
CPC ............ *G01D 11/30* (2013.01); *G01L 19/0007* (2013.01)

(58) Field of Classification Search
CPC ............................. G01L 19/0007; G01L 19/14
See application file for complete search history.

(56) References Cited

U.S. PATENT DOCUMENTS

| 5,535,629 | A * | 7/1996 | Gerdes et al. ................... 73/756 |
| 2003/0010833 | A1 | 1/2003 | Hotta et al. | |

FOREIGN PATENT DOCUMENTS

| CN | 1508525 | 6/2004 |
| CN | 1662799 | 8/2005 |
| CN | 1798791 | 7/2006 |
| CN | 201107140 | 8/2008 |
| DE | 24 06 508 | 8/1975 |
| DE | 102 26 612 | 1/2003 |

OTHER PUBLICATIONS

EP 11 183035.2 Search Report dated Mar. 22, 2012, 6 pages—German, 3 pages—English.
(Continued)

*Primary Examiner* — Lisa Caputo
*Assistant Examiner* — Brandi N Hopkins
(74) *Attorney, Agent, or Firm* — Andrew F. Young, Esq.; Lackenbach Siegel, LLP

(57) ABSTRACT

Provided is a measuring arrangement system operative for measuring a physical and/or chemical process variable of a process medium, which is held in a container, having a measuring device with a process connection and a sensor housing attached to it, such that the process connection comprises a measuring cell housing with a measuring cell, wherein a circumferential web, which divides the circumferential surface into a first and second circumferential section, is provided on the circumferential surface of the measuring cell housing; the process connection comprising a union nut with an inside thread and interior ring stop; and a tubular flange having first and second ends, having on its first end an outside thread, designed to correspond to the inside thread of the union nut, such that the circumferential web is designed so the measuring cell housing can be clamped between the flange and the union nut in two different directions.

19 Claims, 3 Drawing Sheets

(56) References Cited

OTHER PUBLICATIONS

Chinese Pat. Appln. Serial No. 201210325573.2, Office Action mailed Feb. 2, 2015, 5 pages—English; 5 pages—Chinese.

EP 11183035.2 Search Report and Written Opinion dated Mar. 22, 2012. 6 pages-13 German, 3 pages—English.

* cited by examiner

MEASURING ARRANGEMENT SYSTEM FOR A UNIVERSAL PROCESS CONNECTION

CROSS-REFERENCE TO RELATED APPLICATIONS

This application claims priority from U.S. Provisional Application No. 61/540,956 filed on Sep. 29, 2011, the entire contents of which are incorporated herein by reference, and from European Patent Application No. 11183035.2 filed on Sep. 28, 2011, the entire contents of which are incorporated herein by reference.

FIGURE FOR PUBLICATION

FIG. 1

BACKGROUND OF THE INVENTION

1. Field of the Invention

The present invention relates to a measuring arrangement system for a universal process connection. More particularly, the present invention relates to a measuring arrangement system for the process technology for measuring a physical or chemical variable of a process medium, wherein the medium is held in a bounding container.

2. Description of the Related Art

The related art involves measuring arrangements known from DE 196 28 551 B4, for example, the entire contents of which are incorporated herein by reference, and which serves as a measuring device consisting of a process connection and a sensor housing placed thereon as protection for the sensor and the respective electronics. The process connection establishes the connection of the measuring device to a container, which holds the process medium or to a pipeline and/or a connection on a tank and usually comprises the sensor and/or the measuring cell, for example, a pressure measuring cell. With this known measuring arrangement, a sealing ring is provided between the end face of the measuring cell on the side facing the media and a sealing web of the measuring cell housing running around the end face. In addition, a mounting concept is proposed, whereby the measuring device is screwed into a flange, and a seal is implemented on the edge using a sealing ring.

With such a known measuring arrangement, the measuring device can be attached by means of the flange to a container holding the process medium, such that the sensor housing is in a protected area. Unfortunately, with such a process connection, however, it is impossible to expose the measuring device completely to the process medium because the components of the measuring device, such as the sensor housing and the connection cable, which are exposed to the process medium, are not chemically resistant to the process medium and therefore other process connections and/or other materials must be used for these components.

These concerns have negative cost consequences because multiple different process connections or components must be kept on hand for the measuring devices made of different materials for each measuring device, depending on the installation situation of the measuring device. Additionally, the multiple different process connections or components increase the failure rate and possible measurement error overall.

Accordingly, there is a need for an improved system, that overcomes at least one of the concerns noted above.

ASPECTS AND SUMMARY OF THE INVENTION

The proposed invention provides a measuring arrangement system operative for measuring a physical and/or chemical process variable of a process medium, which is held in a container, having a measuring device with a process connection and a sensor housing attached to it, such that the process connection comprises a measuring cell housing with a measuring cell, wherein a circumferential web, which divides the circumferential surface into a first and second circumferential section, is provided on the circumferential surface of the measuring cell housing; the process connection also comprises a union nut with an inside thread and an interior ring stop; and a tubular flange having a first and second end is provided, having on its first end an outside thread, which is designed to correspond to the inside thread of the union nut, such that the circumferential web is designed so that the measuring cell housing can be clamped between the flange and the union nut in two different mounting directions.

An aspect of the present invention is to create a measuring arrangement or a system for the same, of the type defined in the introduction, whose process connection enables the connection to the process medium in different installation situations.

Such a measuring arrangement system for the process measurement technology for measuring a physical and/or chemical process variable of a process medium, which is held in a container, has a measuring device with a process connection and a sensor housing attached to it, such that the process connection comprises a measuring cell housing with a measuring cell. Such a measuring arrangement is characterized according to this invention in that the circumferential web is designed so that the measuring cell housing can be clamped between the flange and the union nut, so that it preferably forms a seal.

The measuring arrangement may preferably be designed so that a circumferential web is provided on the circumferential surface of the measuring cell housing, thereby dividing the circumferential surface into a first and a second circumferential section. Preferably, a sealing groove is connected to each end of the web. The process connection also comprises a union nut with an inside thread and an interior ring stop. Finally, a tubular flange is provided with a first and a second end, having an outside thread on its first end for implementation of a first and a second fastening concept of the measuring device, this outside thread being designed to correspond to the inside thread of the union nut. The outside thread is also designed so that the flange for the first mounting concept can be connected at its second end to a container wall of the container, for establishing a connection of the first end of the flange to the measuring cell housing, its first circumferential section being designed first of all for insertion into the flange until it comes in contact at its first end with the web of the measuring cell housing and its second circumferential section additionally being designed so that to establish a threaded connection of the union nut to the outside thread of the flange, the union nut can be pushed over the second circumferential section of the measuring cell housing and can be screwed onto it, thereby accomplishing contact of the web of the measuring cell housing with the stop of the union nut as well as with the first end of the flange, such that to establish a tight seal with respect to the process medium, at least the sealing groove on the first circumferential section of the measuring cell housing has a sealing element. The outside thread is further designed so that the flange for the second mounting concept can be connected at its second end to a circumferential wall of a protective tube, to establish a connection of the first end of the flange to the measuring cell housing, whose first circumferential section is designed for insertion into to the flange until it comes in contact at its first end with the web of the measuring cell housing, and whose second circumferential section is designed so that to establish a threaded connection of the union nut with the outside thread of the flange, the union nut can be pushed over the first circumferential section of the measuring cell housing and can be screwed in place there, and contact of the web of the measuring cell housing with the stop of the union nut as well as with the first end of the flange is accomplished, such that at least the sealing groove on the second circumferential section of the measuring cell housing has a sealing element to establish a tight seal with respect to the process medium.

With such a process connection of the inventive measuring arrangement system, different mounting concepts each using the same components of the process connection can be operatively implemented.

Firstly, this universal process connection allows the measuring device to be mounted by means of the flange and the union nut on the container wall of a container holding the process medium such as a tank or a pipe, for example. Secondly, the measuring device can be installed directly in the container space by screwing the measuring device into the flange and then screwing the union nut onto the flange from the sensor side, such that according to one embodiment of the invention, the flange is lengthened with a protective tube to protect the measuring device and its connecting cable, so that in the case when there is exposure to a chemically aggressive medium, the components protected by the protective tube, such as the housing of the measuring device and its connecting cable, therefore cannot be attacked by such an aggressive medium and so they need not be resistant to such a medium.

In another embodiment of the invention, the circumferential web of the measuring cell housing is designed with a rectangular cross section, which yields a good form-fitting connection with the union nut in both mounting concepts.

In addition, according to a further refinement of the invention, it is advantageous if the second circumferential section of the measuring cell housing has an inside thread with which a screw connection to the sensor housing can be established. This permits simple and rapid mounting of the measuring cell housing.

Furthermore, according to another embodiment of the invention, it is recommended that in order to establish a tight seal of the sensor surface of the measuring cell with respect to the process medium, the second circumferential section should be designed with a sealing web on the end face to receive a sealant.

Finally, the sealing elements are preferably embodied as O-rings, but are not limited to such, and may be operatively adapted any manner sufficient with the scope of this disclosure to be operative as sealing elements.

The above, and other aspects, features and advantages of the present invention will become apparent from the following description read in conduction with the accompanying drawings, in which like reference numerals designate the same elements.

BRIEF DESCRIPTION OF THE DRAWINGS

A further understanding of the present invention can be obtained by reference to a preferred embodiment set forth in the illustrations of the accompanying drawings. Although the illustrated preferred embodiment is merely exemplary of methods, structures and compositions for carrying out the present invention, both the organization and method of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the present invention, reference is now made to the following drawings in which.

DETAILED DESCRIPTION OF THE PREFERRED EMBODIMENTS

Figure 1:
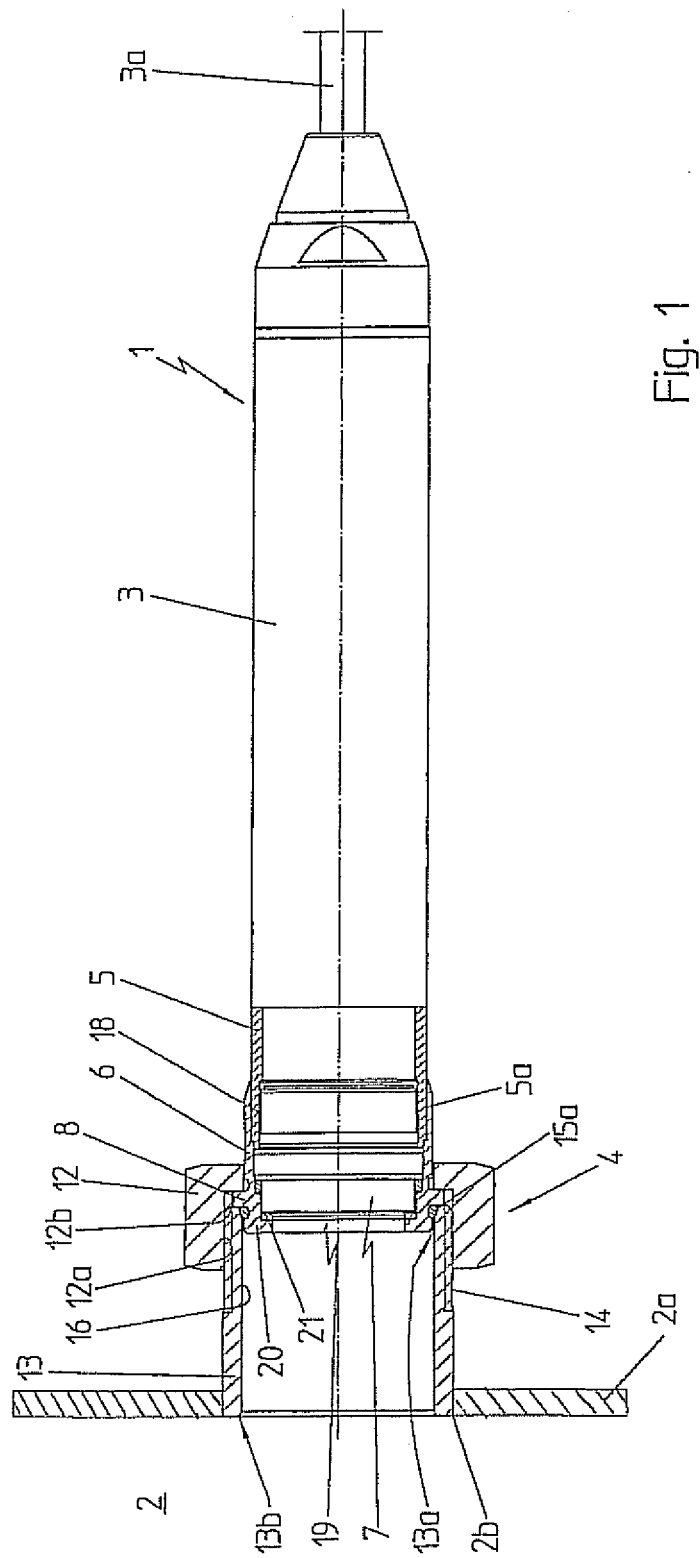
FIG. 1 is a schematic sectional diagram of an inventive measuring arrangement according to the preferred embodiment of the present invention, wherein the measuring arrangement is mounted according to a first mounting concept on a container wall of a container.

As required, a detailed illustrative embodiment of the present invention is disclosed herein. However, techniques, systems, compositions and operating structures in accordance with the present invention may be embodied in a wide variety of sizes, shapes, forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein which define the scope of the present invention.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. For purposes of convenience and clarity only, directional terms, such as top, bottom, up, down, over, above, and below may be used with respect to the drawings. These and similar directional terms should not be construed to limit the scope of the invention in any manner. The words "connect," "couple," and similar terms with their inflectional morphemes do not necessarily denote direct and immediate connections, but also include connections through mediate elements or devices.

Figure 2:
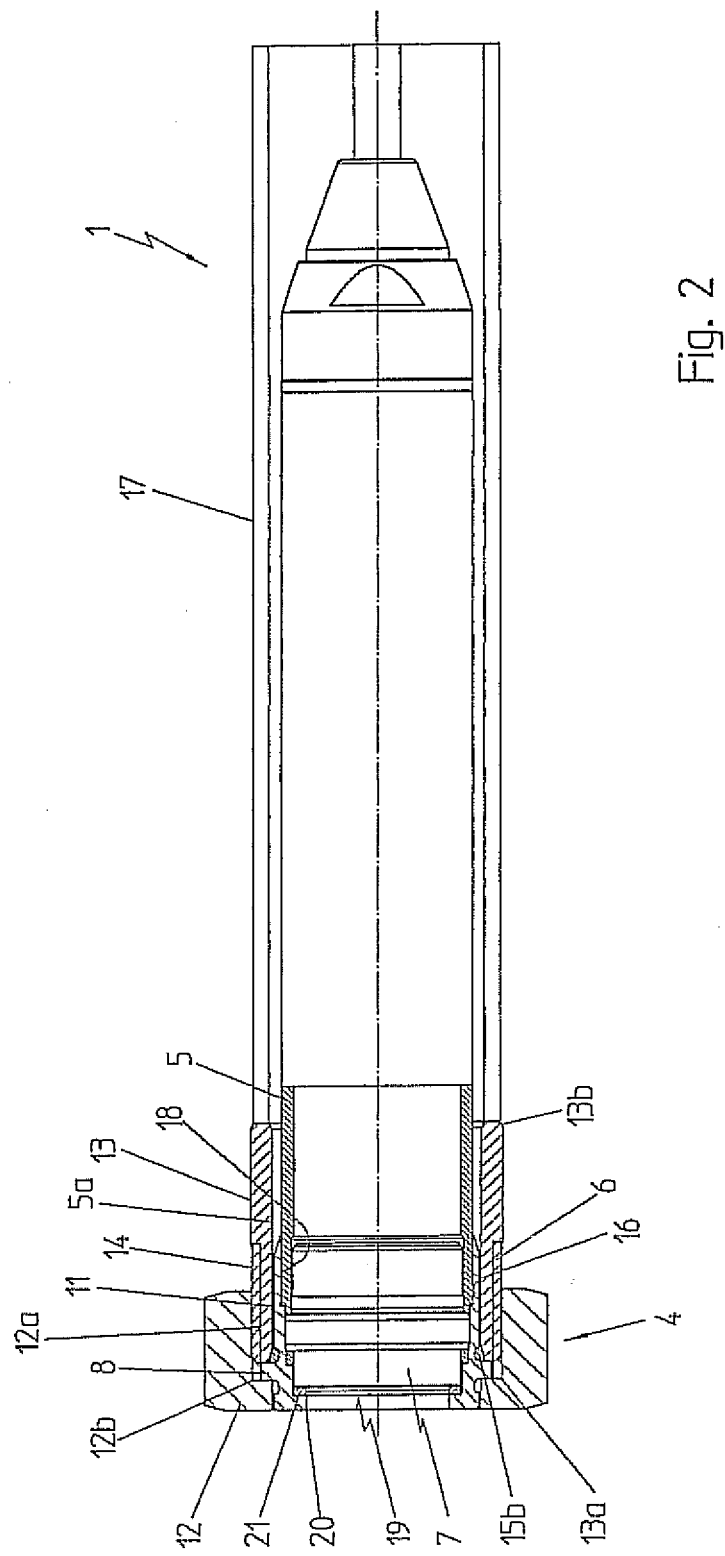
FIG. 2 is a schematic sectional diagram of an alternative embodiment of the measuring arrangement according to the invention, which is constructed according to a second mounting concept.
Figure 3:
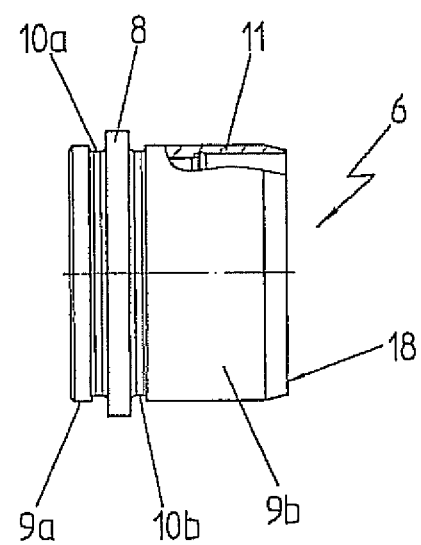
FIG. 3 shows an illustrative side view of a diagram of a measuring cell housing of the measuring arrangement according to the embodiments shown in FIG. 1 and FIG. 2.

Referring now to FIGS. 1 to 3, shown is the preferred embodiment of measuring arrangement 1 according to the invention. In particular, a measuring device 3 with a connecting cable 3a is shown in both FIGS. 1 and 2, and includes a sensor housing 5, which is connected by means of a threaded connection (identified) to a measuring cell housing 6, which holds a measuring cell 7 having a sensor surface 19. The threaded connection between sensor housing 5 and measuring cell housing 6 is established by an outside thread 5a of the sensor housing 5 and a corresponding inside thread 18 of the measuring cell housing 6 which are threadably engageable.

A process connection 4 consists of this measuring cell housing 6 as well as a union nut 12 with an inside thread 12a and an interior ring stop 12b for implementing different mounting concepts for the measuring device 3, which are illustrated in FIGS. 1 and 2.

A first alternative and adaptive mounting concept, depicted in FIG. 1, implements the mounting of the measuring device 3 on a container wall 2a of a container 2, such as a fuel tank or a water tank holding the process medium, for example. To do so, a flange 13 designed as a pipe connection or as a welded connection is used, this flange being connected at a first end 13a to the measuring device 3 by means of the operative process connection 4, while the second end 13b of the flange 13 is connected to a container opening 2b in the container wall 2a by means of a welded connection, for example, so that media contact with the measuring cell 7 comes about. Furthermore, flange 13 has an outside thread 14 on its first end 13a corresponding to the inside thread 12a of the union nut 12.

Tubular measuring cell housing 6 (see FIG. 3) has a circumferential web 8 on its circumferential surface 11, dividing the measuring cell housing 6 into a first circumferential section 9a and a second circumferential section 9b, such that a sealing groove 10a and/or 10b is provided directly on both sides of this circumferential web 8 to receive a sealing element 15a and/or 15b, as will be discussed.

The first circumferential section 9a of the measuring cell housing 6 is matched to the first end 13a of the flange 13, so that it can be inserted into the flange 13 until the first end 13a of the flange 13 on the end is in contact with the web 8 of the measuring cell housing 6. Before being mounted in this way, an operative O-ring is inserted as a sealing element 15a into the sealing groove 10a of the first circumferential section 9a. Next union nut 12 is pushed over connecting table 3a and sensor housing 5, so that union nut 12 can be screwed onto the outside thread 14 of flange 13 by means of its inside thread 12a, until a web 8 of the measuring cell housing 6 is in contact with the ring stop 12b of the union nut 12 at one end face and with the first end 13a of the flange 13 at the other end face. The web height of the web 8 is operably selected so that its circumferential surface is in form-fitting connection with an inside surface of the union nut 12 and thus an urging clamping effect can be operatively achieved between flange 13 and union nut 12, thereby securing web 8 during a use.

Preferably, measuring cell housing 6 and the respective union nut 12 and flange 13 are matched to one another, so that these components may also be used to implement the second alternative and adaptive operative mounting concept shown in FIG. 2. With the second mounting concept depicted in FIG. 2, measuring device 3 is mounted in a protective tube 17 by means of the process connection 4 in such a way that it is operatively situated completely in the container space, where it is attached by means of the connecting cable 3a or a corresponding cable outside of the container. Measuring device 3 and connecting cable 3a are both therefore protected from the process medium, in particular a chemically aggressive medium, so it is not necessary to use materials that are resistant to such media for these components. This is a substantially important cost savings and engineering benefit.

To implement the second mounting concept, the measuring cell housing 6 is inserted into a first end 13a until it comes in contact with circumferential web 8 on first end 13a of flange 13 and is spanned by union nut 12 on flange 13. Before screwing the union nut 12 into the flange, an O-ring, for example, as the sealing element 15b is inserted at least into the sealing groove 10b on the second circumferential section 9b of the measuring cell housing 6. The flange 13 is welded at its second end 13b to the protective tube 17, so that a tight connection is obtained. Due to the symmetrical design of the measuring cell housing 6 with regard to the web with the respective sealing grooves 10a and 10b, the two mounting concepts differ only in the position of the sealing elements 15a and 15b and the direction in which the union nut 12 is screwed on with respect to the measuring cell housing 6.

With such a measuring cell housing 6 and the respective union nut 12 and flange 13, measuring device 3 can be used universally for various mounting concepts, such that a conventional commercial pipe with a nominal width of, for example, 1¼" and a union nut 12 of the size, for example, G 1¼" are used for the flange 13. This reduces the number of components that must be kept on hand for the mounting concepts described here, so this in turn makes it possible to reduce manufacturing costs as well as storage costs.

The remaining elements will be understood by those of skill in the art by review of the entire disclosure and by reviewing the listing of the reference designators (below) without departing from the scope and spirit of the present invention.

It will be further understood by those of skill in the art that the term container is non-limited but is illustrative of at least a partially bounded region or area where a sensor may be positioned relative to a medium of any kind that should be sensed in order to determine a process variable. As a result, the term container will be considered broadly, and without limitation to these examples, may include a wall, a tube, section, region, lid, bottom, side door, etc. of any bounding region or area for sensing.

LIST OF REFERENCE NUMERALS 1 measuring arrangement
2 container or tank
2a container wall
2b container opening
3 measuring device
3a connecting cable
4 process connection
5 sensor housing
5a outside thread of the sensor housing 5
6 measuring cell housing
7 measuring cell
8 web on the circumferential surface of the measuring cell housing
9a first circumferential section of the measuring cell housing 6
9b second circumferential section of the measuring cell housing 6
10a sealing groove on the first circumferential section 9a
10b sealing groove on the second circumferential section 9b
12 union nut
12a inside thread of the union nut 12
12b ring stop of the union nut 12
13 flange
13a first end of the flange 13
13b second end of the flange 13
14 outside thread of the flange 13
15a sealing element of the sealing groove 10a
15b sealing element of the sealing groove 10b
16 inside thread of the flange 13
17 protective tube
18 inside thread of the measuring cell housing 6
19 sensor surface
20 sealing web
21 sealing element In the claims, means or step-plus-function clauses are intended to cover the structures described or suggested herein as performing the recited function and not only structural equivalents but also equivalent structures. Thus, for example, although a nail, a screw, and a bolt may not be structural equivalents in that a nail relies on friction between a wooden part and a cylindrical surface, a screw's helical surface positively engages the wooden part, and a bolt's head and nut compress opposite sides of a wooden part, in the environment of fastening wooden parts, a nail, a screw, and a bolt may be readily understood by those skilled in the art as equivalent structures.

Having described at least one of the preferred embodiments of the present invention with reference to the accompanying drawings, it is to be understood that such embodiments are merely exemplary and that the invention is not limited to those precise embodiments, and that various changes, modifications, and adaptations may be effected therein by one skilled in the art without departing from the scope or spirit of the invention as defined in the appended claims. The scope of the invention, therefore, shall be defined solely by the following claims. Further, it will be apparent to those of skill in the art that numerous changes may be made in such details without departing from the spirit and the principles of the invention. It should be appreciated that the present invention is capable of being embodied in other forms without departing from its essential characteristics.

The invention claimed is:

1. An adaptive measuring system for a process connection with a container bounding a process medium, said system comprising:
   (a) a measuring device having a process connection;
   (b) a sensor housing operatively connected to said process connection;
      (i) said process connection further comprises:
         a union nut member defining a nut opening therethrough and an interior ring stop defining a ring stop opening less than said nut opening; and
         a nut inside thread on an inner surface of said nut opening;
   (c) said process connection further comprises:
      (i) a measuring cell housing operative to secure a measuring cell;
      (ii) said measuring cell housing comprising:
         a bounding ring defining an opening there through and having an outer circumferential surface and an inner circumferential surface; and
         a circumferential web member projecting outwardly from said circumferential surface and dividing said circumferential surface into first and second circumferential sections;
         said first and second circumferential sections being less than said nut opening;
   (d) a tubular flange member having a first tube end and a second tube end and defining an opening therethrough for an operative connection with said container during a use;
      (i) said tubular flange member further comprising:
         an outside flange thread proximate said first end and operative to threadably engage said nut inside thread of said union nut and secure said circumferential web member between said tubular flange member and said nut opening in a first and a second direction thereby enabling said adaptive measuring system to adapt to at least two process connections with said container.

2. An adaptive measuring system, according to claim 1, further comprising:
   (a) a first groove section and a second groove section formed on said circumferential surface of said measuring cell housing;
   (b) said circumferential web member spacing said first and second groove sections on respective said first and said second circumferential sections; and
   (c) at least one sealing element in at least one of said first and said second groove sections;
   whereby said at least one sealing element is operative to seal said flange and said measuring cell housing in either said first or said second direction to enable said at least two process connections.

3. An adaptive measuring system, according to claim 1, further comprising:
   (a) a protective tube member operative to accommodate said sensor housing;
   (b) said protective tube member connected to a second end of said tubular flange member.

4. An adaptive measuring system, according to claim 1, wherein;
   (a) said circumferential web member has a generally rectangular cross section.

5. An adaptive measuring system, according to claim 1, wherein:
   (a) said second circumferential section of said measuring cell housing has an inside thread on said inner circumferential surface;
   (b) said inside thread operative to engage an outer portion of said sensor housing thereby to secure said measuring cell housing to said sensor housing.

6. An adaptive measuring system, according to claim 1, further comprising:
   (a) an inner circumferential sealing web projecting inwardly from said inner circumferential surface of said measuring cell housing;
   (b) a measuring cell in said measuring cell housing having a sensor surface; and
   (c) an inner surface of said inner circumferential sealing web proximate said sensor surface, thereby enabling a tight seal between said measuring cell and said process medium.

7. A measuring arrangement system for the process measurement technology for measuring a physical and/or chemical process variable of a process medium held in a container, said system comprising:
   a measuring device having a process connection and a sensor housing attached to the process connection, such that the process connection comprises a measuring cell housing with a measuring cell;
   wherein a circumferential web that divides a circumferential surface of the measuring cell housing into a first and second circumferential section is provided on the circumferential surface of the measuring cell housing;
   wherein the process connection further comprises a union nut with an inside thread and an interior ring stop; and
   wherein a tubular flange having a first and second end is provided with an outside thread on its first end, which is designed to correspond to the inside thread of the union nut, such that the circumferential web is configured such that the measuring cell housing can be clamped between the flange and the union nut in two different mounting directions.

8. A measuring arrangement system according to claim 7, characterized in that:

a sealing groove is connected on each end of the web, the process connection also comprises a union nut with an inside thread and an interior ring stop, and the outside thread of the tubular flange being designed to correspond to the inside thread of the union nut and also being designed so that the flange for the first mounting concept can be connected to an external container wall of the external container at its second end to establish a connection of the first end of the flange to the measuring cell housing, its circumferential section firstly being designed for being inserted into the flange until its first end is in contact with the web of the measuring cell housing, and secondly its second circumferential section being designed so that to establish a threaded connection of the union nut with the outside thread of the flange, the union nut can be pushed onto the second circumferential section of the measuring cell housing and screwed in place there, and contact of the web of the measuring cell housing with the stop of the union nut as well as with the first end of the flange is accomplished, such that to establish a tight seal with respect to the process medium, the sealing groove on the first circumferential section of the measuring cell housing has a sealing element, and the flange for the second mounting concept which can be connected at its second end to a circumferential wall of a protective tube to establish a connection of the first end of the flange to the measuring cell housing, is designed on the one hand for its first circumferential section for insertion into the flange until its first end is in contact with the web of the measuring cell housing and, on the other hand, its second circumferential section is designed so that in order to establish a threaded connection of the union nut with the outside thread of the flange, the union nut can be pushed over the first circumferential section of the measuring cell housing and can be screwed in place there, and contact of the web of the measuring cell housing with the stop of the union nut as well as with the first end of the flange is accomplished, such that to establish a tight seal with respect to the process medium, at least the sealing groove on the second circumferential section of the measuring cell housing has a sealing element.

9. A measuring arrangement system according to claim 7, characterized in that:

for the second mounting concept, a protective tube which accommodates the sensor housing and is connected in a form-fitting manner to the second end of the flange is provided.

10. A measuring arrangement according to claim 9, characterized in that:

the second circumferential section of the measuring cell housing has an inside thread with which a screw connection to the sensor housing is established.

11. A measuring arrangement according to claim 9, characterized in that:

to establish a tight seal of a sensor surface of the measuring cell with respect to the process medium, the first circumferential section is designed with a sealing web on the end face to receive a sealing element.

12. A measuring arrangement according to claim 7, characterized in that:

the circumferential web of the measuring cell housing is designed with a rectangular cross section.

13. A measuring arrangement according to claim 10, characterized in that:

the second circumferential section of the measuring cell housing has an inside thread with which a screw connection to the sensor housing is established.

14. A measuring arrangement according to claim 10, characterized in that:

to establish a tight seal of a sensor surface of the measuring cell with respect to the process medium, the first circumferential section is designed with a sealing web on the end face to receive a sealing element.

15. A measuring arrangement according to claim 7, characterized in that:

the second circumferential section of the measuring cell housing has an inside thread with which a screw connection to the sensor housing is established.

16. A measuring arrangement according to claim 11, characterized in that:

to establish a tight seal of a sensor surface of the measuring cell with respect to the process medium, the first circumferential section is designed with a sealing web on the end face to receive a sealing element.

17. A measuring arrangement according to claim 7, characterized in that:

to establish a tight seal of a sensor surface of the measuring cell with respect to the process medium, the first circumferential section is designed with a sealing web on the end face to receive a sealing element.

18. A measuring arrangement according to claim 17, characterized in that:

the sealing elements are designed as O-rings.

19. A measuring arrangement according to claim 7, characterized in that:

the sealing elements are designed as O-rings.

* * * * *